United States Patent [19]
Filgas et al.

[11] Patent Number: 5,463,710
[45] Date of Patent: Oct. 31, 1995

[54] LASER - OPTICAL FIBER TUNING AND CONTROL SYSTEM

[75] Inventors: David M. Filgas, Walnut Creek; Gordon M. McFadden, Danville; Jeffrey Broome, Livermore, all of Calif.; James F. York, Tempe, Ariz.

[73] Assignee: Hobart Laser Products, Inc., Livermore, Calif.

[21] Appl. No.: 942,637

[22] Filed: Sep. 9, 1992

[51] Int. Cl.⁶ .................................... G02B 6/36
[52] U.S. Cl. .................................... 385/90; 385/44
[58] Field of Search .................. 385/25, 38, 88, 385/89, 90, 91, 92, 93, 94, 97, 98, 902, 44, 45, 48; 372/6, 9, 20

[56] References Cited

U.S. PATENT DOCUMENTS

| | | | |
|---|---|---|---|
| 3,554,721 | 1/1968 | Gardner | 65/4 |
| 4,173,390 | 11/1979 | Kach | 385/44 |
| 4,173,392 | 11/1979 | Ekinaka et al. | 350/96 |
| 4,474,423 | 10/1984 | Bisbee et al. | 385/97 |
| 4,673,290 | 6/1987 | Johnson et al. | 356/73 |
| 4,712,096 | 12/1987 | Cholin et al. | 340/590 |
| 4,765,706 | 8/1988 | Marcatili et al. | 385/44 |
| 4,812,641 | 3/1989 | Ortiz, Jr. | 250/205 |
| 4,854,667 | 8/1989 | Ebata et al. | 350/96 |
| 4,911,522 | 3/1990 | Iwamoto et al. | 385/97 |
| 4,916,707 | 4/1990 | Rosenkranz | 372/38 |
| 4,929,045 | 5/1990 | Fuller | 350/96 |
| 5,039,191 | 8/1991 | Myszka | 385/31 |
| 5,127,072 | 6/1992 | Blauvelt et al. | 385/88 |

OTHER PUBLICATIONS

J. Jablonowski, Ed. American Machinist, "You've Come A Long Way, Laser"; J. Vaccari, $CO_2$ and YAG Lasers Tackle Tougher Tasks (Mar. 1992) pp. 6, 37–48.

*Primary Examiner*—Rodney B. Bovernick
*Assistant Examiner*—John Ngo
*Attorney, Agent, or Firm*—David H. Jaffer

[57] ABSTRACT

A laser-optical fiber tuning and control system which optimizes coupling of a laser output into an optical fiber by minimizing the amount of light scattered into the fiber cladding, which provides a realtime indication of whether the radiation reaches the output end of the fiber to an emergency shut-down switch, and which provides a communications system for control of the laser from the output end of the optical fiber.

6 Claims, 1 Drawing Sheet

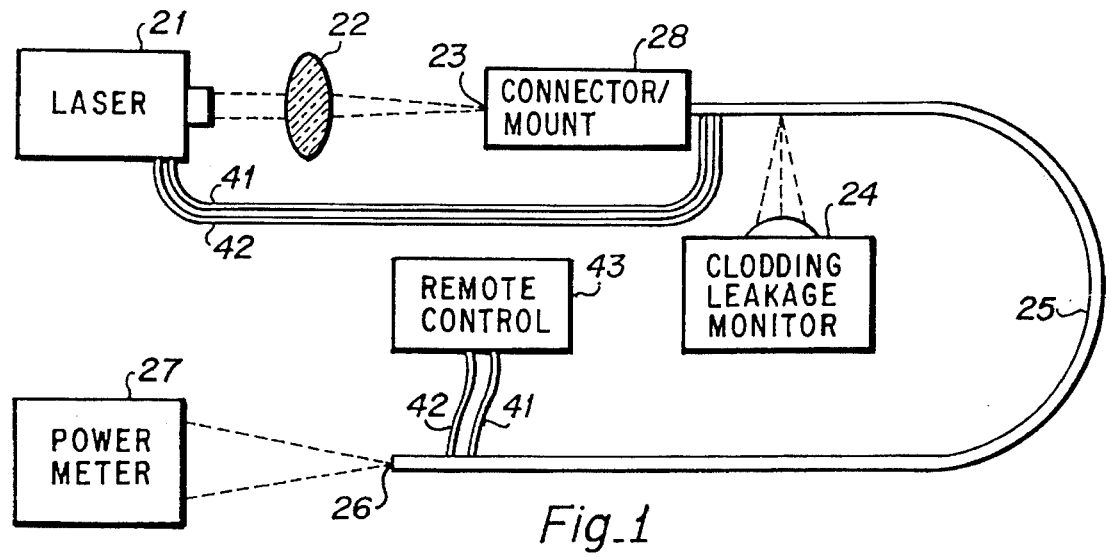
Fig_1
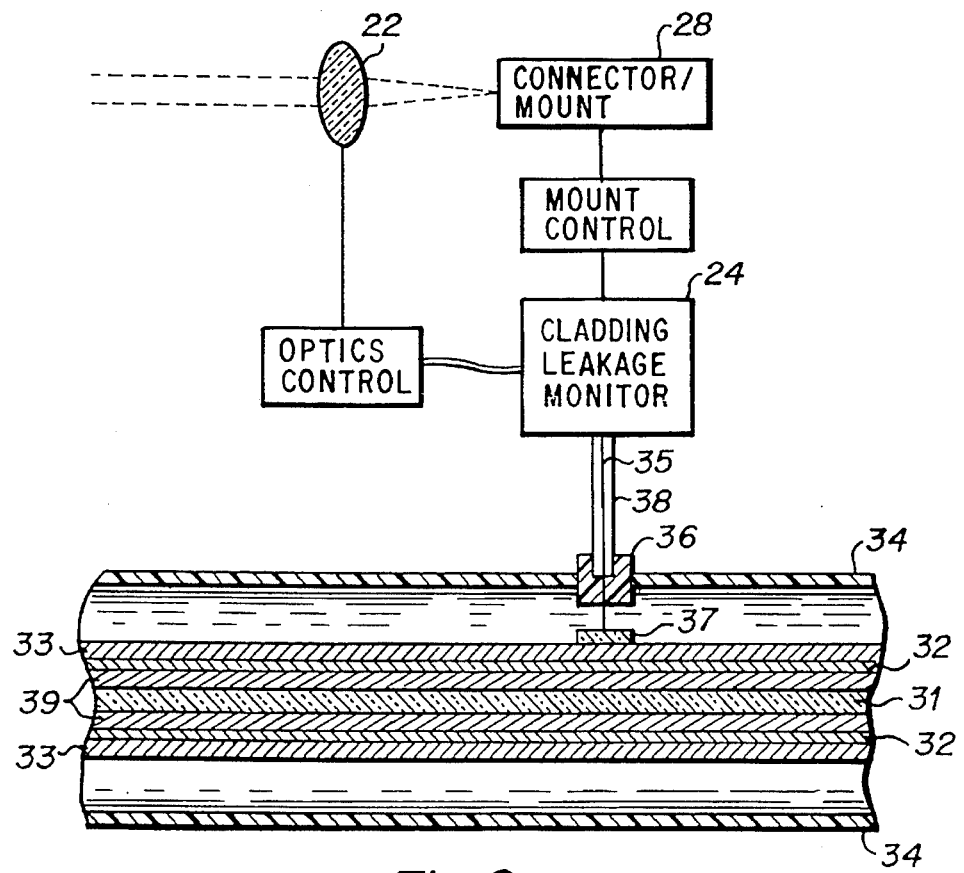
Fig_2

LASER - OPTICAL FIBER TUNING AND CONTROL SYSTEM

BACKGROUND OF THE INVENTION

1. Field of the Invention

This invention relates generally to a system for optimizing coupling of a laser output to an optical fiber, and more particularly to a system which (a) optimizes alignment of the laser radiation with the optical fiber, and (b) permits monitoring and control of the laser radiation from the output end of the optical fiber.

2. Brief Description of the Prior Art

When laser radiation is transmitted through an optical fiber, alignment of the laser radiation with the optical fiber is critical to minimize losses. Such losses reduce the radiation output at the end of the optical fiber, and may also cause thermal heating at the input end of the optical fiber. Heating can damage or destroy the optical fiber connector and/or optical fiber interface. Therefore, the prior art provides a number of devices to optimize positioning of laser radiation into an optical fiber. In general, these devices optimize positioning by either maximizing the light output through the optical fiber or visually align the laser and fiber. U.S. Pat. Nos. 5,127,072; 5,039,191; and 4,949,045 are examples of the alignment techniques used in the prior art.

The prior art also teaches monitoring of the output from an optical fiber at the output end of the optical fiber to determine whether the laser radiation input into the optical fiber is reaching the output end. See U.S. Pat. Nos. 4,812,641 and 4,712,096.

SUMMARY OF THE INVENTION

It is a primary object of the present invention to provide a system for optimizing alignment of laser radiation into an optical fiber, to monitor the output end of the optical fiber for use in safety purposes, and to provide control means at the output end of the optical fiber in communication with the laser system permitting immediate control of the laser radiation.

Another object of the present invention is to provide a method for minimizing light scattered into an optical fiber when laser radiation is injected into the fiber, thereby reducing light leakage and consequent thermal heating.

A further object of the present invention is to provide a method for automatically aligning laser radiation into an optical fiber. This method may be used to optimize the positioning of multiple beam portions into multiple optical fibers after division of the laser radiation into multiple beam portions.

It is still another object of the present invention to provide a system for safely using high power laser radiation output from an optical fiber at a location some distance from the laser.

Briefly, the preferred embodiment of the present invention optimizes positioning of laser radiation into an optical fiber by monitoring the amount of scattered radiation in the optical fiber. When scattered radiation is minimized, the alignment of the laser light into the optical fiber is maximized. The scattered light is preferably monitored at a right angle to the optical fiber, some distance beyond the point at which the laser radiation is input into the optical fiber. Alignment may be automated with a feedback loop that positions the laser input into the optical fiber while minimizing scattered laser light. If the laser radiation is divided into several optical fibers, the same method may be used to optimize positioning of each divided portion of the laser output into each optical fiber. Laser radiation exiting the output end of the optical fiber is monitored in a similar manner to provide a realtime indication of whether the laser radiation is reaching the output end of the optical fiber. This system includes an emergency shutdown system which turns off the laser if laser radiation ceases to reach the output end of the optical fiber, indicating that there is a break in the optical fiber. The system also provides optical communication fibers in addition to the laser light optical fiber. These communication fibers provide a communication system between the output end of the optical fiber and the laser, such that the laser may be controlled from the output end of the optical fiber.

IN THE DRAWING

FIG. 1 is a schematic view of the preferred embodiment of the present invention; and FIG. 2 is a view of the preferred embodiment of the optical fiber tuning system.

DETAILED DESCRIPTION OF THE PREFERRED EMBODIMENT

This invention provides a method for optimizing alignment of laser radiation into an optical fiber, monitoring output from the output end of the optical fiber in realtime, and providing communications from the output end of the optical fiber to the laser head.

Referring now to FIG. 1 of the drawing, a view of the system for tuning laser radiation into an optical fiber is shown. Laser 21 provides laser radiation which is focused with input optics 22 onto optical fiber input face 23. The optical fiber lies within a protecting cable 25, and extends to fiber output face 26. Laser radiation exiting the optical fiber impinges upon beam dump or power meter 27.

Rough alignment of the laser radiation exiting from input optics 22 with fiber input face 23 is provided visually and/or through conventional mechanical alignment utilizing a mechanical connector/mount 28 to a fixed mount position where input optics 22 focus the laser radiation on fiber input face 23.

More precise alignment of the laser radiation into the optical fiber is provided through use of a system including cladding leakage monitor 24, which may be coupled to a feedback loop acting upon input optics 22 and/or connector/mount 28.

With reference to FIG. 2, a more detailed view of the preferred embodiment of the tuning system is shown. Optical fiber core 31, which is preferably composed of ultrapure synthetic fused silica in this embodiment because fused silica is transparent to 1064 nm YAG laser light, has fluorine-doped fused silica cladding layer 39 to provide internal reflection of radiation in the optical fiber core. Optical fiber cladding 39 is surrounded by a buffer layer 32, preferably silicone. An extruded outer jacketing 33, preferably of nylon or tefzel, surrounds buffer 32. Jacketing 33 and buffer 32 are translucent or transparent to allow scattered light to exit the buffer and jacketing. The jacketed optical fiber is protected by a cable 34, preferably composed of a flexible strengthened opaque tube. A stainless steel cable approximately 0.25 inches in diameter is used in the preferred embodiment. Cable 34 permits flexible use of the optical fiber over distances of hundreds of meters, while protecting the optical fiber from breakage. In the preferred embodiment, the jacketed optical fiber (with buffer 32 and outer jacketing 33) has a diameter of about 1.5 mm, and is free inside cable 34, thereby allowing the jacketed optical fiber to move freely within cable 34 as it is disposed.

A second optical fiber 35 within second cable 38 is connected to cable 34 with T-connector 36. Second optical fiber 35 (which, for simplicity, is shown without buffer or outer jacketing) is attached to outer jacketing 33 of first optical fiber 31 by fiber connector 37.

When laser radiation is focused onto input face 23 of the optical fiber as shown in FIG. 1, some of the laser radiation and some stray excitation light which comes out of laser 21 will inevitably leak into the optical fiber buffer layer and through the outer jacketing. As shown in FIG. 2, second optical fiber 35 is preferably placed at right angles to first optical fiber 31. This minimizes pick-up of stray excitation light (white light background noise) from the laser, increases the ratio of leakage laser radiation to background white light that passes through fiber 35 to leakage monitor 24, and makes leakage monitor 24 more sensitive. In other words, for any fixed position of input optics 22 and connector/mount 28, second optical fiber 35 is positioned such that the light it picks up from outer jacketing 33 has as high a ratio of leakage laser radiation to background noise as possible.

Some laser radiation which is off-axis of optical fiber 31 may not be internally reflected, and may leak through cladding 39, buffer layer 32 and outer jacketing 33. Since this off-axis light leakage reduces the power of the laser radiation exiting optical fiber 31 at its output end, and also causes thermal heating where the radiation is absorbed (possibly creating thermal damage), minimization of this leakage light is desirable. In addition, we have found that by minimizing the amount of laser radiation leaking through cladding 39 to buffer 32 and jacketing 33, alignment of the laser radiation into the optical fiber may be optimized. Leakage through jacketing 33 is monitored some distance from the input end of the fiber 23. This distance is not critical, provided that the distance between input face of fiber 31 and the site of second optical fiber 35 is sufficient that the high level of scattered light at the input face has been reduced to an acceptable level so that leakage from optical fiber 31 through jacketing 33 may be reliably monitored. We have found that a distance of 150 mm works well.

Second optical fiber 35 is connected to leakage monitor 24, a photo-sensitive detector which provides a realtime measure of the amount of radiation leaving optical fiber 31 through leakage into cladding 39, buffer 32, and jacketing 33. In order to isolate leakage of laser radiation, filters may be used to pass only light of the wavelength of the laser light and to exclude stray excitation light. Note that while the preferred embodiment monitors light leakage from optical fiber 31 with a second optical fiber connected to a photo-sensitive detector, any detector capable of detecting the light leaking from the first optical fiber 31 would be suitable. For example, a detector could be mounted where it could directly detect the light leakage from the optical fiber, or a view port in cable 34 could be used to observe the leakage from the fiber with a suitable detector.

Since monitor 24 provides a realtime measure of light leaking from optical fiber 31 through cladding 39, buffer 32, and jacketing 33, this information may be used to optimize positioning of input optics 22 and/or connector/mount 28 for alignment of the laser radiation with the optical fiber. Alignment may be optimized either by hand control of the input optics and/or connector/mount 28. Alternatively, alignment may be optimized by a feedback loop that monitors light leakage with monitor 24, and provides feedback to move input optics and/or connector/mount 28 in a manner that reduces leakage from optical fiber 31. The movement of input optics 22 and/or connector/mount 28 thus may be controlled, for example piezo-electrically. Suitable adjustment devices (both manual and automated) providing motion in three perpendicular axes are well known in the art, as are devices for tilt adjustment in two axes. Suitable feedback loops are also common in the electronic arts. This technique of optimizing positioning by minimizing light leakage from the optical fiber may be used in conjunction with a power monitor at the end of the optical fiber (27 in FIG. 1), or alone.

As is apparent from FIG. 2 in the description above, the laser radiation exiting from the laser source may be split into multiple beams, each of which may be channeled to an optical fiber and optimally positioned into the optical fiber with the use of the tuning technique described above.

A second cladding leakage monitor as shown in FIG. 2 may be positioned near the output end of the optical fiber. This second cladding leakage monitor provides a realtime monitor at the output end of the optical fiber. Since there will always be some light leakage into the cladding even at a long distance from the laser (the light leakage measured at about 12 inches from the laser input is about 500 times the light leakage measured at 200 meters), if there is light leakage at the first monitor near the input end of the optical fiber, but no light leakage at a position near the output end of the optical fiber, a break in the optical fiber is indicated. The second cladding leakage monitor is connected to an emergency shutdown switch which automatically stops the laser when a failure condition exists. Although the amount of leakage is low at long distances from the laser, this system is very sensitive because it is not necessary to measure the amount of leakage; it is only necessary to detect whether or not there is leakage.

FIG. 1 shows an additional feature of this invention. A communications system is incorporated with cable 25. The communications system permits laser 21 to be controlled from the output end of the optical fiber 26. In the preferred embodiment, laser 21 provides laser radiation which is focused with input optics 22 onto optical fiber input face 23. Communications fibers (preferably optical fibers) 41 and 42 are provided to connect the controls of laser 21 and laser remote control 43, which is located near fiber output face 26 where the laser power exits. In the preferred embodiment, a single cable 25 protects the optical fiber which delivers laser light, and the two communications fibers, simplifying disposition and use of the laser/optical fiber system. One of the communications fibers is dedicated to providing information from the laser to laser remote control 43 near the output end of the cable, such as power, temperature of the laser, etc. The second communication fiber provides means for the laser remote control 43 to communicate with the laser. In this manner, signals may be sent which permit the power of the laser to be adjusted, turned on or off, etc.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An apparatus for optimizing coupling of laser radiation into a transmission optical fiber comprising:

(a) a transmission optical fiber;

(d) a laser radiation source for providing laser radiation to the input end of the transmission optical fiber;

(c) first means for monitoring radiation leakage from the transmission optical fiber;

(d) means for adjusting positioning of the laser radiation into the transmission optical fiber to minimize the amount of radiation leakage from the transmission optical fiber detected by the first radiation leakage monitor;

(e) second means for monitoring radiation leakage from the transmission optical fiber positioned near the output end of the transmission optical fiber; and (f) control means for automatically stopping input of the laser radiation source to the transmission optical fiber when the second radiation leakage monitor indicates that laser radiation input to the transmission optical fiber is not reaching the output end of the transmission optical fiber.

2. The apparatus of claim 1, further comprising:

(a) a laser remote control located near the output end of the transmission optical fiber;

(b) a laser control for adjusting and monitoring the laser radiation source; and (c) at least one communication fiber linking the laser remote control with the laser control, whereby information concerning the laser is provided to the laser remote control and the laser remote control communicates with the laser control, thereby permitting power or other adjustments to the laser radiation output.

3. An apparatus for optimizing coupling of laser radiation into a transmission optical fiber comprising:

(a) a transmission optical fiber;

(b) a laser radiation source for providing laser radiation to the input end of the transmission optical fiber;

(c) means for monitoring radiation leakage from the transmission optical fiber;

(d) means for adjusting positioning of the laser radiation into the transmission optical fiber to minimize the amount of radiation leakage from the transmission optical fiber;

(e) a laser remote control located near the output end of the transmission optical fiber;

(f) a laser control for adjusting and monitoring the laser radiation source; and (g) at least one communication fiber linking the laser remote control with the laser control, whereby information concerning the laser is provided to the laser remote control and the laser remote control communicates with the laser control, thereby permitting power or other adjustments to the laser radiation output.

4. An apparatus for monitoring and control of laser radiation from near the output end of a transmission optical fiber comprising:

(a) a laser radiation source;

(b) a transmission optical fiber into which laser radiation is input from the laser radiation source;

(c) means for monitoring radiation leakage from the transmission optical fiber positioned near the output end of the transmission optical fiber; and (d) control means for automatically stopping input of the laser radiation source to the transmission optical fiber when the radiation leakage monitor indicates that laser radiation input to the transmission optical fiber is not reaching the output end of the transmission optical fiber.

5. The apparatus of claim 4, wherein the means for monitoring radiation leakage comprises a second optical fiber positioned to transmit a portion of the radiation leakage from the transmission optical fiber to a radiation sensitive detector, whereby the radiation leakage from the transmission optical fiber is monitored.

6. The apparatus of claim 4, further comprising:

(a) a laser remote control located near the output end of the transmission optical fiber;

(b) a laser control for adjusting and monitoring the laser radiation source; and (c) at least one communication fiber linking the laser remote control with the laser control, whereby information concerning the laser is provided to the laser remote control and the laser remote control communicates with the laser control, thereby permitting power or other adjustments to the laser radiation output.

* * * * *